US00RE37591E

(19) United States
(12) Reissued Patent
Shimada et al.

(10) Patent Number: US RE37,591 E
(45) Date of Reissued Patent: Mar. 19, 2002

(54) LIQUID CRYSTAL DISPLAY DEVICE

(75) Inventors: Takayuki Shimada, Taki-gun; Miyuki Tsuruya, Yamatokoriyama; Masumi Kubo, Ikoma; Kazuyori Mitsumoto, Taki-gun; Naofumi Kondo, Taki-gun; Mikio Katayama, Taki-gun, all of (JP)

(73) Assignee: Sharp Kabushiki Kaisha, Osaka (JP)

(21) Appl. No.: 09/685,575

(22) Filed: Oct. 11, 2000

Related U.S. Patent Documents

Reissue of:
(64) Patent No.: 5,822,027
Issued: Oct. 13, 1998
Appl. No.: 08/886,404
Filed: Jul. 1, 1997

(30) Foreign Application Priority Data

Jul. 2, 1996 (JP) ..... 8-172032
Oct. 8, 1996 (JP) ..... 8-266830

(51) Int. Cl.[7] ..... G02F 1/1343; G02F 1/136
(52) U.S. Cl. ..... 349/39; 349/43; 349/144
(58) Field of Search ..... 349/38, 39, 144, 349/42, 43; 257/72

(56) References Cited

U.S. PATENT DOCUMENTS 5,212,574 A * 5/1993 Katayama et al. ..... 349/54
5,394,258 A * 2/1995 Morin et al. ..... 349/39
5,585,951 A * 12/1996 Noda et al. ..... 349/122
5,641,974 A * 6/1997 Den Boer et al. ..... 257/59
5,659,375 A * 8/1997 Yamashita et al. ..... 349/38
5,729,308 A * 3/1998 Yamazaki et al. ..... 349/39
5,953,084 A * 9/1999 Shimada et al. ..... 349/38

FOREIGN PATENT DOCUMENTS

JP 2-275927 * 11/1990

* cited by examiner

*Primary Examiner*—William L. Sikes
*Assistant Examiner*—Dung Nguyen
(74) *Attorney, Agent, or Firm*—Nixon & Vanderhye, P.C.

(57) ABSTRACT

The liquid crystal display device includes an active matrix substrate, a counter substrate having a counter electrode, and a liquid crystal layer interposed between the active matrix substrate and the counter substrate. The liquid crystal display device further includes a plurality of scanning lines, a plurality of signal lines formed perpendicular to the plurality of scanning lines, switching elements formed in the vicinity of crossings of the plurality of scanning lines ad the plurality of signal lines, a plurality of pixel electrodes connected to the corresponding signal lines via the switching elements, and a plurality of supplemental capacitance lines formed in parallel with the corresponding scanning lines, wherein the pixel electrodes are formed over the corresponding scanning lines, and divisions of the adjacent pixel electrodes along the signal lines are located above the corresponding supplemental capacitance lines.

16 Claims, 13 Drawing Sheets

PRIOR ART

PRIOR ART

LIQUID CRYSTAL DISPLAY DEVICE

Matter enclosed in heavy brackets [ ] appears in the original patent but forms no part of this reissue specification; matter printed in italics indicates the additions made by reissue.

BACKGROUND OF THE INVENTION

1. FIELD OF THE INVENTION:

The present invention relates to a liquid crystal display device which is used as a display of a computer, a TV set, and the like, for example, and includes switching elements such as thin film transistors (hereinbelow, referred to as TFTs) as addressing elements.

2. DESCRIPTION OF THE RELATED ART:

FIG. 11 is an exemplary equivalent circuit of a conventional TFT type liquid crystal display device using TFTs as switching elements. Pixel electrodes 6 are formed in a matrix, and TFTs 1 as switching elements are connected to the respective pixel electrodes 6. A gate electrode of each TFT 1 is connected to a gate line 2 as a scanning line so that the TFT 1 can be driven under control of a gate signal input to the gate electrode via the gate line 2. A source electrode of the TFT 1 is connected to a source line 3 as a signal line so that a data (display) signal can be input to the corresponding pixel electrode 6 via the TFT 1 when the TFT 1 is being driven. Such gate lines 2 and source lines 3 are provided perpendicular to each other along the peripheries of the pixel electrodes 6 arranged in a matrix. A drain electrode of each TFT 1 is connected to the corresponding pixel electrode 6 and a supplemental capacitance ($C_s$). A counter electrode of the supplemental capacitance is connected to a common line 4 (hereinbelow, referred to as a $C_s$ line). Liquid crystal ($C_{1c}$) interposed between the pixel electrode 6 and a counter electrode 18 is thus driven.

In order to reduce power consumption of such an active matrix liquid crystal display device, a technique of increasing the aperture ratio of a liquid crystal display device by overlapping pixel electrodes with lines via an interlayer insulating film is disclosed in Japanese Laid-Open Patent Publication No. 6-160900. According to this technique, however, the orientation of the liquid crystal is disordered due to a failure in rubbing at steps formed by lines and TFTs, and crosstalk arises due to a parasitic capacitance generated between the interlayer insulating film and the pixel electrodes. Such troubles badly influences the display. The above publication neither discloses nor suggests any means for solving these problems.

FIG. 12 is a plan view of one pixel portion of an active matrix substrate of a liquid crystal display device 600 proposed by the applicant of the present application in Japanese Patent Application No. 7-206367for solving the above problems.

Referring to FIG. 12, the gate lines 2 and the source lines 3 as shown in FIG. 11 are formed on a transparent substrate to run perpendicular to each other. The TFT 1 is formed as a switching element in the vicinity of each of the crossings of the gate lines 2 and the source lines 3, and is connected to the corresponding pixel electrode 6 through a connection line 5 via a contact hole 7 formed through an interlayer insulating film (not shown). The connection line 5 overlaps a supplemental capacitance ($C_s$) line 4 via a gate insulating film (not shown), forming a supplemental capacitance. The pixel electrode 6 overlaps the adjacent gate lines 2 and source lines 3 via the interlayer insulating film. With this configuration, the aperture ratio of the resultant liquid crystal display device improves, and disclination can be suppressed since the electric field generated by the lines 2 and 3 is shielded. Moreover, when the gate and source lines 2 and 3 are formed of a conductive light-shielding material such as metal, they can be used as light-shielding films between the pixel electrodes 6. The parasitic capacitance can be reduced by increasing the thickness of the interlayer insulating film to about 2 $\mu$m. Conventionally, the vertically adjacent pixel electrodes 6 in the source line direction are generally separated from each other along and above the corresponding gate line 2, as shown in FIG. 12 and as disclosed in the Japanese Laid-Open Patent Publication No. 6-160900.

The active matrix substrate with the above configuration is attached to a counter substrate with a liquid crystal layer interposed therebetween, so as to form a liquid crystal display device. In order to realize a color display in such a liquid crystal display device, color filters are generally formed on the counter substrate. A black matrix is generally provided on the color filters formed on the counter substrate to prevent color mixing and light leakage. In order to reduce production cost, however, omitting such a black matrix has been proposed in the above-mentioned Japanese Patent Application No. 7-206367, for example.

When the black matrix is omitted, the gate and source lines 2 and 3 serve as the light-shielding films for spaces between the pixel electrodes 6. However, a peripheral region surrounding a display region (the region where the plurality of pixel electrodes 6 are formed) of the liquid crystal panel is not shielded. In the peripheral region, shielding of light from a backlight is required especially in the case of a black display. Otherwise, leakage of light from the backlight from the peripheral region will lower the display quality. Moreover, this light shielding should preferably be in such a level as to obtain a light transmittance of 0.1% or less, in consideration of the contrast ratio of the resultant liquid crystal display device.

Omitting the formation of a light-shielding film on the counter substrate is an effective way of reducing production-cost of the liquid crystal display device as described above. Therefore, the development of a liquid crystal display device where light leakage from the peripheral region surrounding the display region can be prevented without forming a light-shielding film on the counter substrate has been sought.

As a solution to the above problem, the applicant of the present application has formed a light-shielding pattern in the peripheral region as shown in FIG. 13. More specifically, a liquid crystal display device 700 has a light-shielding pattern 30 with a line width of 1 mm to several millimeters formed in the peripheral region located between the display region and external driving circuits 22 and 23 of an active matrix substrate. With this configuration, light leakage from the peripheral region can be sufficiently reduced.

FIG. 14 is a layout showing a boundary between the display region and the peripheral region. Specifically, an outermost one of the pixel electrodes 6 located lowermost of the display region shown in FIG. 13 and the portion of the light-shielding pattern 30 adjacent to the outermost pixel electrode 6 are shown. The light-shielding pattern 30 formed in the peripheral region overlaps the source lines 3 extending to the peripheral region. This increases the parasitic capacitance in the peripheral region. Moreover, when the light-shielding pattern 30 is formed so as to short-circuit with the outermost gate line 2 corresponding to the outermost pixel electrode 6, the width of the outermost gate line 2 becomes 1 mm to several millimeters, while that of the other normal gate lines is only several micrometers to several tens of micrometers. This further increases the parasitic capacitance, and the time constant becomes so large due to the increased parasitic capacitance that the outermost gate line 2 cannot be driven sufficiently. In the case of a liquid crystal display device with a diagonal of 12 inches, for example, the parasitic capacitance may become nearly ten times as large as the supplemental capacitance of the normal gate lines 2. This causes problems in both the output capacity of the driver and the time constant of the lines.

In order to avoid the above problems, the light-shielding pattern 30 needs to be separated from the outermost gate line 2. For this separation, a gap 31 should be formed therebetween as shown in FIG. 14. This causes another problem of light leakage from this gap. Such light leakage is visually recognizable enough to lower the display quality even if the gap is a minute slit with a width of several micrometers to about 10 $\mu$m. It is therefore important to layout the light-shielding pattern 30 so as not to form such a gap 31 in order to enhance the display quality.

An objective of the present invention is to provide a liquid crystal display device where production cost can be reduced without lowering the display quality.

SUMMARY OF THE INVENTION

The liquid crystal display device of this invention including an active matrix substrate, a counter substrate having a counter electrode, and a liquid crystal layer interposed between the active matrix substrate and the counter substrate, further includes: a plurality of scanning lines; a plurality of signal lines formed perpendicular to the plurality of scanning lines; switching elements formed in the vicinity of crossings of the plurality of scanning lines and the plurality of signal lines; a plurality of pixel electrodes connected to the corresponding signal lines via the switching elements; and a plurality of supplemental capacitance lines formed in parallel with the corresponding scanning lines, wherein the pixel electrodes are formed over the corresponding scanning lines, and divisions of the adjacent pixel electrodes along the signal lines are located above the corresponding supplemental capacitance lines.

In one embodiment of the invention, one of the supplemental capacitance lines is located outermost of a display region of the active matrix substrate for the pixel electrode which is located at a first peripheral side of the display region, the supplemental capacitance line being wider than the other supplemental capacitance lines and serving as a light-shielding line.

In another embodiment of the invention, a counter electrode signal is directly applied to the supplemental capacitance line which is located outermost of the display region and serves as the light-shielding line at a plurality of positions.

In still another embodiment of the invention, the liquid crystal display device further includes a light-shielding line which is formed for the pixel electrode located at a second peripheral side of the display region opposing the first peripheral side, in parallel with the supplemental capacitance line located outermost of the display region.

In still another embodiment of the invention, a counter electrode signal is input to the light-shielding line.

In still another embodiment of the invention, each of the switching elements is formed on a side of the corresponding scanning line nearer to a signal source from which a signal is input to the signal lines.

In still another embodiment of the invention, an insulting film is formed between the scanning lines and the pixel electrodes, and the thickness of the insulting film is about 2 $\mu$m or more.

In still another embodiment of the invention, each of the pixel electrodes has a cutout formed above the corresponding scanning line.

In still another embodiment of the invention, each of the pixel electrodes includes two parts defined by the cutout formed above the corresponding scanning line and a plurality of connection portions connecting the two parts.

In still another embodiment of the invention, the plurality of connection portions are formed at opposite ends of the pixel electrode.

In still another embodiment of the invention, a width of at least one of the plurality of connection portions is different from a width of the other connection portions.

Thus, the invention described herein makes possible the advantage of providing a liquid crystal display device where production cost can be reduced without lowering the display quality.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the relevant drawings.

(EXAMPLE 1)

Figure 1A:
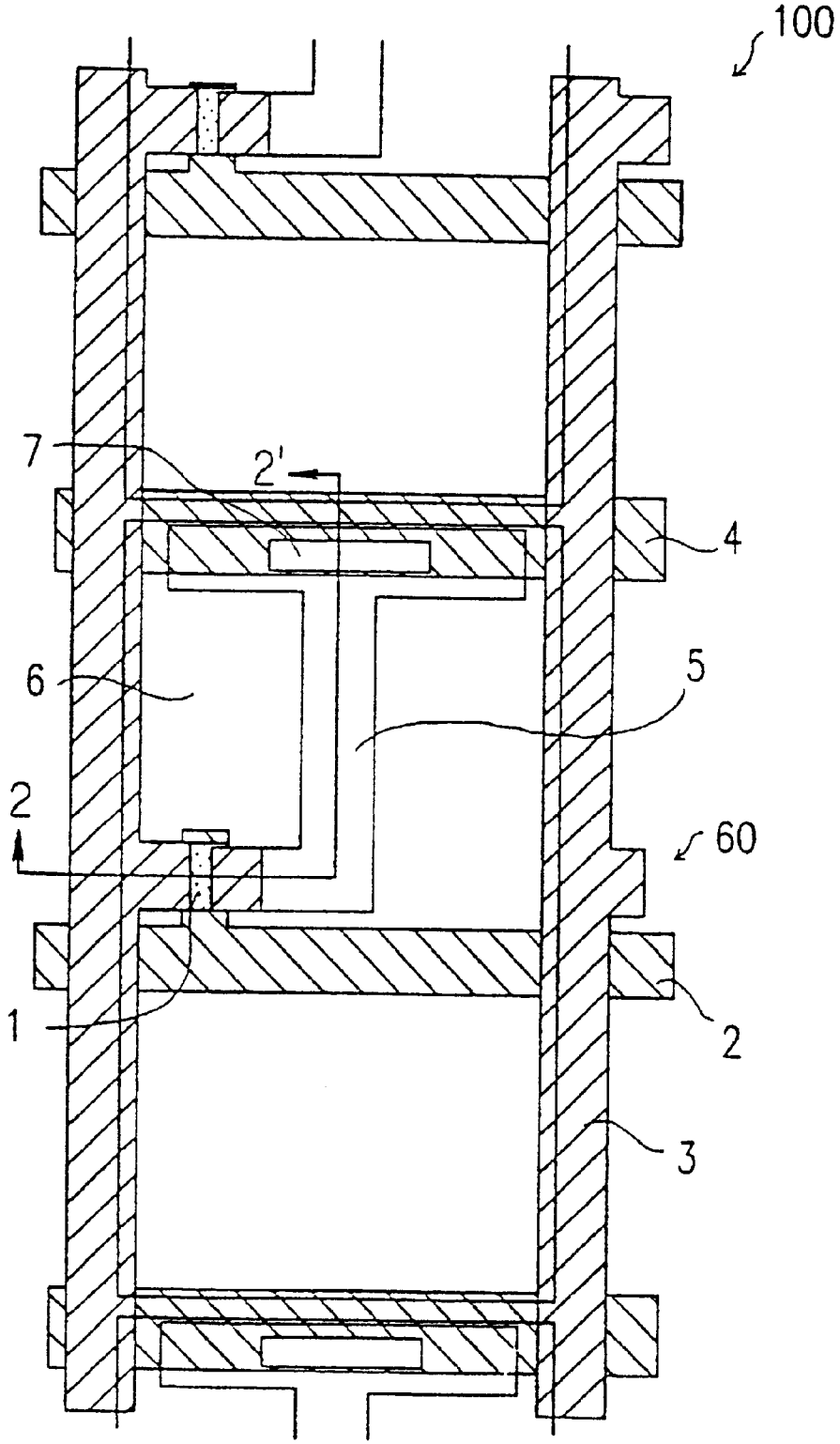
FIG. 1A is a plan view of one pixel portion of a liquid crystal display device of Example 1 according to the present invention.

FIG. 1A is a plan view of one pixel portion 60 of an active matrix substrate of a liquid crystal display device 100 of Example 1 according to the present invention.

Referring to FIG. 1A, the active matrix substrate includes a plurality of pixel electrodes 6 formed in a matrix, gate lines 2 as scanning lines and source lines 3 as signal lines formed perpendicular to each other, and $C_s$ lines 4 for forming supplemental capacitance formed in parallel with the gate line 2 and perpendicular to the source lines 3. These lines are made of light-shielding conductive films such as tantalum and aluminum.

According to the present invention, each pixel electrode 6 is formed across the corresponding gate line 2, so that the pixel aperture corresponding to the pixel electrode 6 is divided into two portions by the gate line 2. The pixel electrode 6 is separated from the adjacent pixel electrodes 6 above the $C_s$ lines 4 vertically and above the source lines 3 horizontally. Thus, all spaces between the pixel electrodes 6 where no electric field is applied to the corresponding portions of liquid crystal are shielded. A TFT 1 is formed at each of the crossings of the gate lines 2 and the source lines 3 in one of the two aperture portions as a switching element for the pixel electrode 6. A drain electrode of the TFT 1 is connected to the pixel electrode 6 via a connection line 5 through a contact hole 7 formed through an interlayer insulating film (not shown). Thus, a supplemental capacitance for this pixel is formed above the $C_s$ line 4 located on the TFT-side aperture portion of the pixel (the upper aperture portion located above the TFT 1 in FIG. 1A).

Figure 1B:
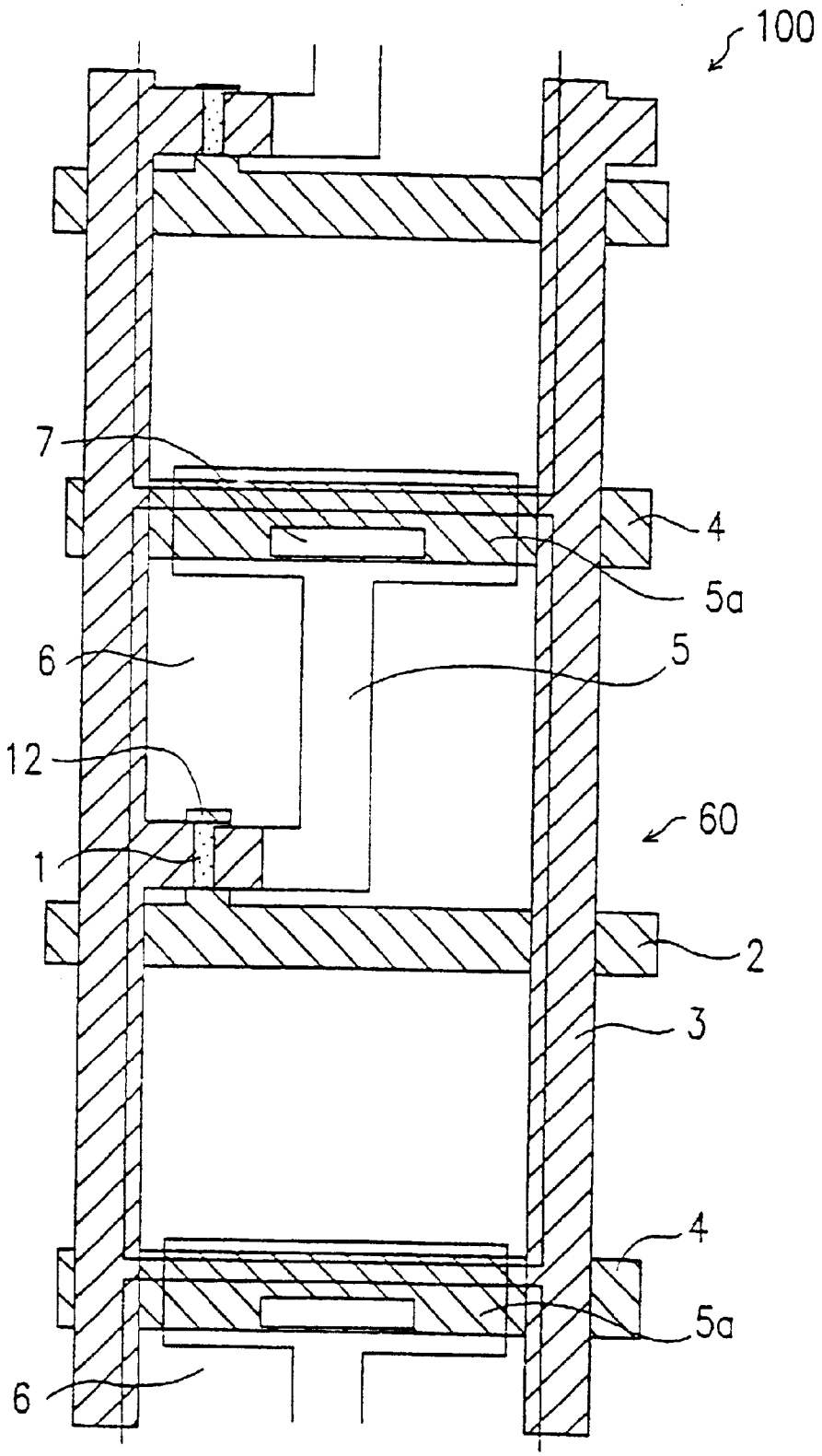
FIG. 1B is a plan view of one pixel portion of another liquid crystal display device according to the present invention.

The supplemental capacitance formation portion of the connection line 5 may also be shaped so as to cover the entire width of the $C_s$, line 4 as the connection line 5a shown in FIG. 1B. With this configuration, a large supplemental capacitance can be obtained. With this configuration, a parasitic capacitance between the connection line 5 and the adjacent pixel electrode 6 is more or less generated. The influence of such a parasitic capacitance, however, can be reduced by thickening the interlayer insulating film and reducing the overlap of the connection line 5 with the adjacent pixel electrode 6.

Figure 2:
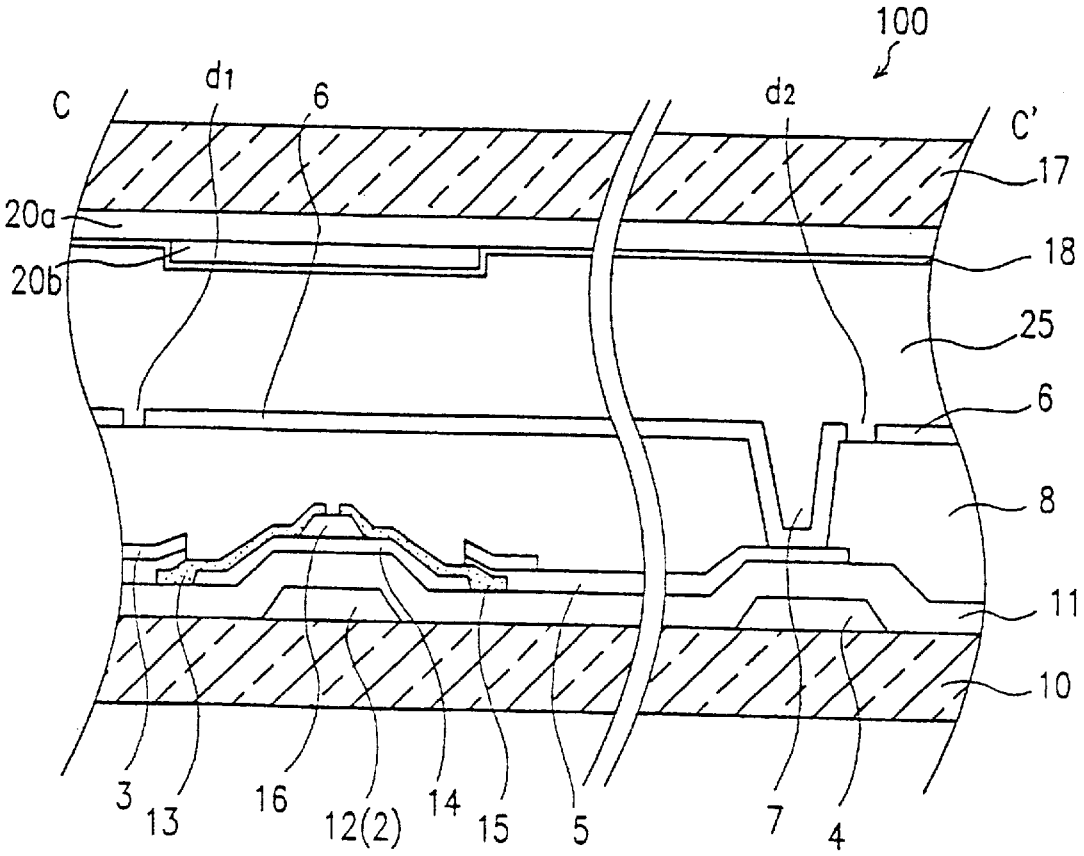
FIG. 2 is a sectional view of the liquid crystal display device of FIG. 1A, taken along line C–C' of FIG. 1A.

FIG. 2 is a sectional view of the liquid crystal display device 100 of this example, taken along line C–C' of FIG. 1A.

A method for fabricating the liquid crystal display device 100 will be described with reference to FIG. 2. First, the gate lines 2, gate electrodes 12, and the $C_s$ lines 4 shown in FIG. 1A, which are made of tantalum, aluminum, or the like, are simultaneously formed on a transparent substrate 10 such as a glass substrate. A gate insulting film 11 made of silicon nitride, silicon oxide, or the like is formed over the resultant substrate. Then, a semiconductor layer 14 made of amorphous silicon, polysilicon, or the like, a channel protection layer 16 made of silicon nitride or the like, and an n+silicon layer which is to be source electrodes 13 and drain electrodes 15 are sequentially formed.

Thereafter, a transparent conductive film made of ITO or the like and a metal film made of tantalum, aluminum, or the like are sequentially formed by sputtering and patterning into a predetermined shape to form the source lines 3 and the connection lines 5. A photosensitive acrylic resin with a dielectric constant of 3.4 is applied to the resultant structure by spin coating to form a flat interlayer insulating film 8 with a thickness of 3 $\mu$m, for example. In this example, a polymer of methacrylic acid and glycidyl methacrylate was used as a base polymer of the photosensitive acrylic resin, and a naphthoxydiazido positive photosensitive agent was used as a photosensitive agent thereof. The resin is then exposed to light using a mask of a predetermined pattern and developed with an alkaline solution, so that only the exposed portions of the resin are etched away with the alkaline solution, forming the contact holes 7 through the depth of the interlayer insulating film 8.

A transparent conductive film made of ITO or the like is then formed on the resultant structure by sputtering and patterned to form the pixel electrodes 6. Thus, each pixel electrode 6 is connected via the corresponding contact hole 7 formed through the interlayer insulating film 8 to the corresponding connection line 5 which is in turn connected to the drain electrode 15 of the corresponding TFT 1. In this example, the plurality of pixel electrodes 6 are separated from one another along and above the source lines 3 and the $C_s$ lines 4. That is, each division $d_1$ of the pixel electrodes 6 which are along the gate line 4 is placed above the source lines 3, and each division $d_2$ of the pixel electrodes 6 which are along the source lines 3 is placed above the $C_s$, lines 4.

The active matrix substrate with the above configuration is then attached together with a counter substrate having red, green, and blue color filters 20a and counter electrodes 18 formed on a transparent substrate 17 such as a glass substrate using a sealing material (not shown). Liquid crystal 25 is filled in a space formed between the two substrates. Alignment films formed on the substrates and polarizing plates are used when they are required.

In the liquid crystal display device 100 of Example 1, as shown in FIG. 2, a color filter 20b is formed to overlap the color filter 20a on each of the portions of the counter substrate corresponding to the channels of the TFTs 1. For example, when the color filter 20a is green, the color filter 20b of red is formed to overlap the color filter 20a so as to effect light shielding by two color overlapping. This makes it possible to shield the channels of the TFTs of an inverted-stagger type bottom gate structure and thus to prevent an erroneous operation of the TFTs due to light leakage.

Figure 3:
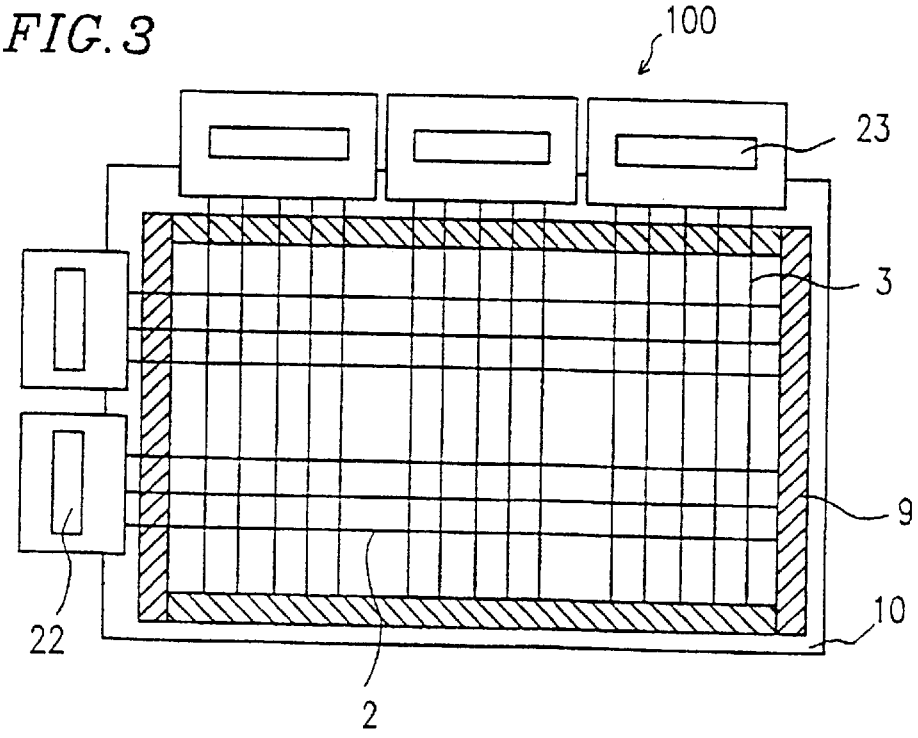
FIG. 3 is a plan view of an active matrix substrate of the liquid crystal display device according to the present invention.

FIG. 3 is a plan view of the active matrix substrate of the liquid crystal display device 100 of this example. Referring to FIG. 3 a light-shielding pattern 9 is formed along the periphery of a display region (region where the plurality of pixel electrodes are formed) on the transparent substrate 10. A gate line driving circuit 22 is connected to the gate lines 2, and a source line driving circuit 23 is connected to the source lines 3.

Figure 4:
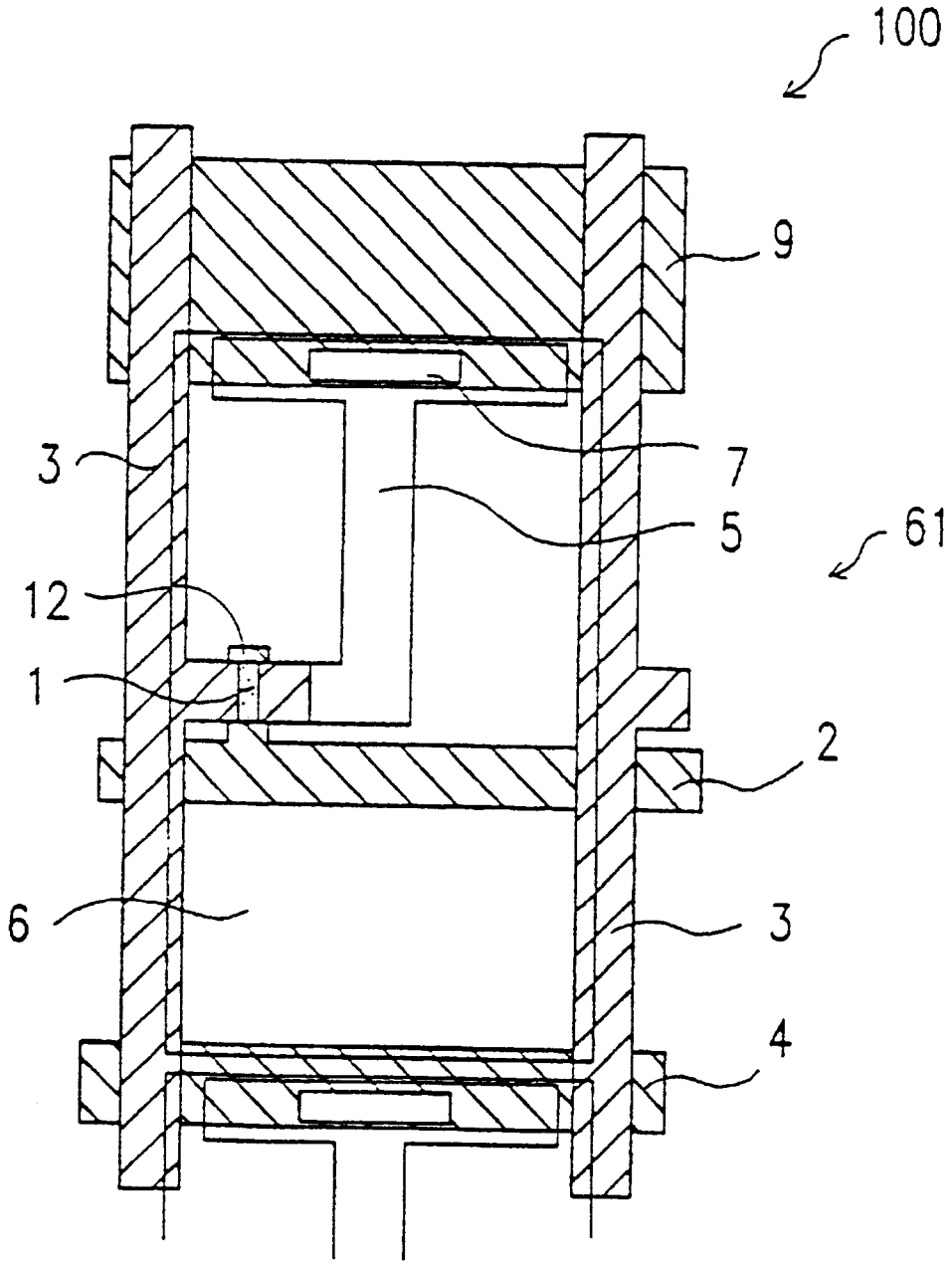
FIG. 4 is a plan view of a pixel portion located outermost of a display region of the liquid crystal display device according to the present invention.

FIG. 4 is a layout of an outermost pixel portion 61 located outermost of the display portion. The outermost pixel portion 61 shown in FIG. 3 is located nearest to the source line driving circuit 23. The light-shielding pattern 9 is formed in the same patterning step as that of the gate lines 2 and the $C_s$ lines 4.

Figure 5A:
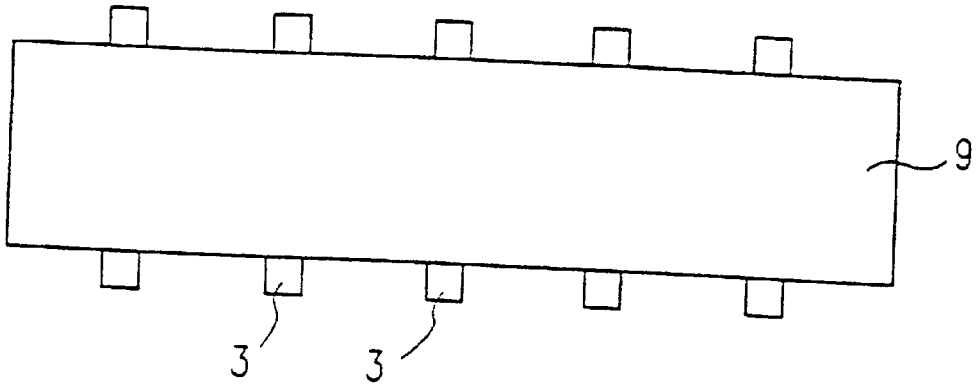
FIGS. 5A to 5C are layouts of a light-shielding pattern formed along the periphery of the display region of the liquid crystal display device according to the present invention.
Figure 5B:
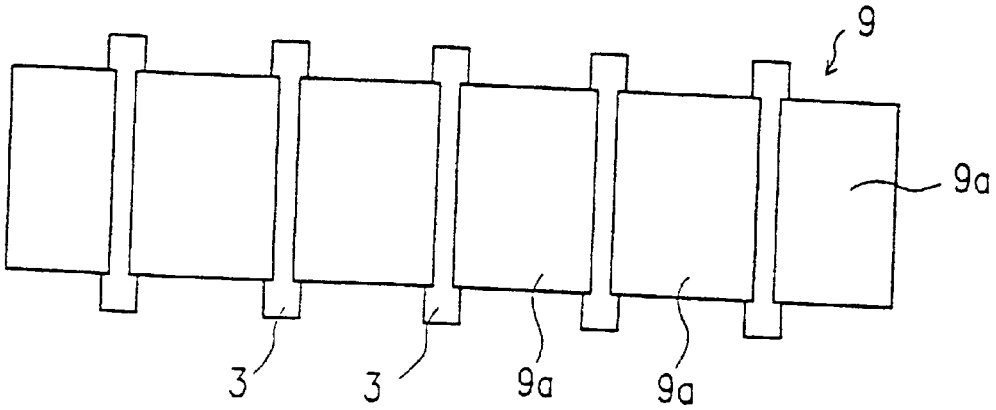
Figure 5C:
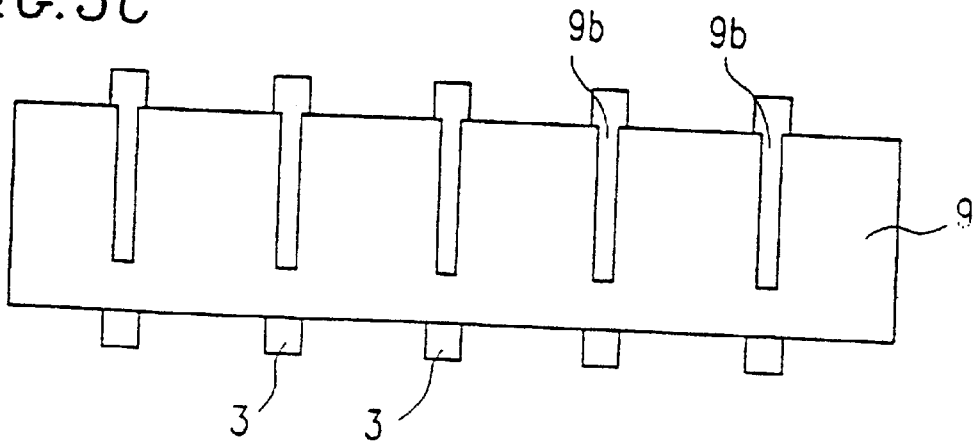

FIGS. 5A to 5C show examples of the light-shielding pattern 9, as viewed from the side of the transparent substrate 10 (see FIG. 2). In other words, FIGS. 5A to 5C show the back sides of the examples of the light-shielding pattern 9, unlike the other plan views (e.g., FIGS. 1A and 4).

FIG. 5A shows the case where the light-shielding pattern 9 also serves as the $C_s$, line 4 of the outermost pixel portion 61 located nearest to the source line driving circuit 23. In this case, the $C_s$, line 4 of the outermost pixel portion 61 as the light-shielding pattern 9 has a width of 1 mm to several millimeters, which is larger compared with the width millimeters, which is larger compared with the width (normally, 10 $\mu$m to 40 $\mu$m) of the $C_s$ lines 4 of the pixel portions 60 (see FIG. 1A or 1B) other than the outermost pixel portions. However, in the case of a driving method where signals with the opposite polarities are input to any two adjacent source lines 3, such as dot inversion driving and line inversion driving, no problem relating to the time constant arises, since, in such a method, a DC signal such as GND and +3V is used as a counter electrode signal input to the light-shielding pattern 9.

The light-shielding pattern 9 may be cut at portions thereof overlapped by the source lines 3 to be divided into a plurality of portions 9a, as shown in FIG. 5B. In this case, the counter electrode signal should be input to each of the portions 9a. This configuration reduces the parasitic capacitance between the light-shielding pattern 9 and the source lines 3 and thus reduces the time constant. The light-shielding pattern 9 with this configuration is therefore advantageous for a large-scale liquid crystal display device and/or a liquid crystal display device employing a driving method where an AC driving signal is applied to the counter electrodes, such as 1 H inversion (gate line inversion) driving and field inversion driving.

Instead of dividing the light-shielding pattern 9, cutouts 9b may be formed at portions of the light-shielding pattern 9 overlapped by the source lines 3, as shown in FIG. 5C. In this case, it is not required to apply the counter electrode signal to each of the portions 9a as in the case of FIG. 5B. This configuration also reduces the parasitic capacitance between the light-shielding pattern 9 and the source lines 3 and thus reduces the time constant. The light-shielding pattern 9 with this configuration is therefore effective for a large-scale liquid crystal display device and/or a liquid crystal display device employing a driving method where an AC signal is applied to the counter electrodes.

Thus, according to the present invention, the $C_s$, line 4, not the gate line 2, serves as the light-shielding pattern 9. This reduces the influence of the time constant, because the counter electrode signal is less influenced by the time constant, compared with the gate line signal, since the counter electrode signal does not change the polarity for at least 1 H period even if it is an AC driving signal.

Figure 6:
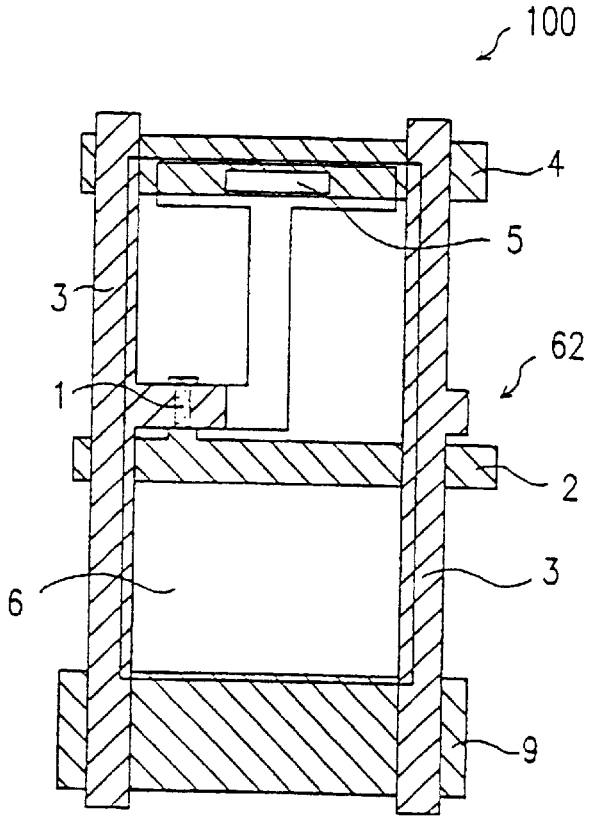
FIG. 6 is a plan view of a pixel portion located outermost of the display region of the liquid crystal display device according to the present invention.

FIG. 6 is a layout of an outermost pixel portion 62 located farthest from the source line driving circuit 23 (located lowermost of the display region in FIG. 3). For the outermost pixel portion 62 located farthest from the source line driving circuit 23, the light-shielding pattern 9 serves as a dummy line. In this case, also, the counter electrode signal is preferably input to the light-shielding pattern 9 so that the driving conditions of the pixel electrode 6 of the outermost pixel portion 62 are the same as those of the pixel electrodes 6 of the pixel portions 60 other than the outermost pixel portions. The layouts of the light-shielding pattern 9 shown in FIGS. 5A to 5C may also be used. In FIGS. 5A to 5C, the source lines 3 extend outward from the light-shielding pattern 9. The source lines 3 may end within the light-shielding pattern 9 when these layouts are used for the outermost pixel portion 62 located farthest from the source line driving circuit 23.

In the liquid crystal display device 100 of this example, the space (or division) between any two adjacent pixel electrodes 6 lined along the source line 3 is located above the corresponding $C_s$ line 4. The light-shielding pattern 9 is therefore formed including the $C_s$ line 4, not including the gate line 2. This allows the outermost pixel electrodes 6 to be driven under the similar conditions to the other pixel electrodes 6. Moreover, since the light-shielding pattern 9 is not required to be formed separately from the outermost line ($C_s$ line 4), no gap is formed along the periphery of the display region and thus the display quality improves by preventing the light leakage in the periphery.

In this example, a thick (e.g., 3 $\mu$m thick) resin with a low dielectric constant (e.g., a dielectric constant of 3.4) is formed as the interlayer insulating film 8. This reduces the parasitic capacitance between the gate line 2 and the pixel electrode 6 and thus reduces the feedthrough. As a result, lowering of the display quality and degradation of the liquid crystal due to application of a DC component thereto can be prevented. The interlayer insulating film 8 with a thickness of 3 $\mu$m was used in this example. However, the interlayer insulating film 8 having a thickness of about 2 $\mu$m or more can sufficiently reduce the influence of the parasitic capacitance, though a thicker interlayer insulating film 8 is more preferable to further reduce the parasitic capacitance. In order to maintain high productivity, however, the thickness should preferably be about 5 $\mu$m or less.

A photosensitive acrylic resin was used, in this example, as a material of the interlayer insulating film 8. Other types of photosensitive resins and nonphotosensitive resins (e.g., JSS-924 and JSS-925manufactured by Japan Synthetic Rubber Co., Ltd.) which have surface smoothness may also be used. Since the interlayer insulating film 8 is as thick as several micrometers, the transmittance thereof is preferably as high as possible. Specifically, a material with a light transmittance of about 90% or more for the transmitting light wavelength of 400 to 800 nm is preferred. Since the human eyes have a luminosity for blue slightly lower than that for green and red, the display quality will not be lowered even if the blue light transmittance of the interlayer insulating film 8 is slightly low.

The formation of the interlayer insulating film 8 which is as thick as several micrometers and has a smooth surface prevents disordered orientation of the liquid crystal and disclination due to the electric field generated by the lines. Slant light from a backlight can be effectively utilized by overlapping the pixel electrodes with the lines by several micrometers. This increases the contrast and widens the viewing angle.

For light exposure of a photosensitive resin, a mercury lamp which emits light having a line spectrum including an i line (wavelength:365 nm), an h line (wavelength:405 nm), and a g line (wavelength:436 nm) is generally used. As the photosensitive resin for the interlayer insulating film 8 in this example, therefore, it is preferable to use a resin having an absorption peak for the i line which is ultraviolet light having the highest energy among the line spectrum. Using such a resin, the contact holes can be processed with high precision, and coloring caused by a photosensitive agent can be minimized. Ultraviolet light with a short wavelength emitted from an excimer laser may also be used for the light exposure.

Thus, by using the colorless interlayer insulating film, the transmittance of the transmission type liquid crystal display device increases. This increases the brightness of the liquid crystal display device and lowers the amount of light from the backlight. As a result, the power consumption is reduced.

(EXAMPLE 2)

Figure 7:
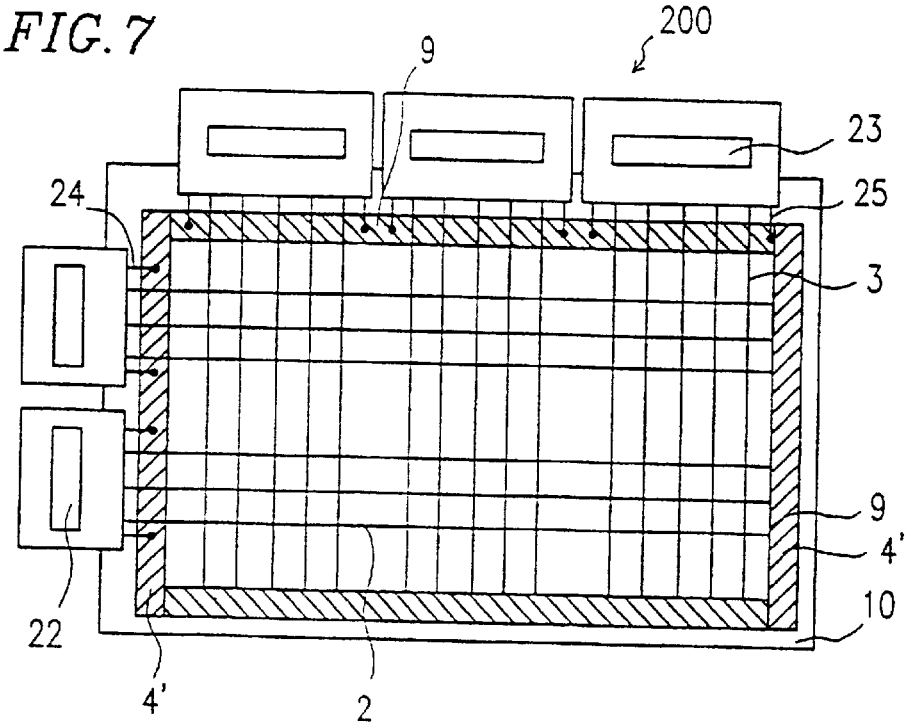
FIG. 7 is a plan view of an active matrix substrate of a liquid crystal display device of Example 2 according to the present invention.

FIG. 7 is a plan view of an active matrix substrate of a liquid crystal display device 200 of Example 2. Referring to FIG. 7, a light-shielding pattern 9 is formed along the periphery of the display region (region where a plurality of pixel electrodes are formed) on a transparent substrate 10. A gate line driving circuit 22 is connected to gate lines 2, and a source line driving circuit 23 is connected to source lines 3.

The configurations of the pixel portions 60, 61, and 62 described in Example 1 also apply to this example. Specifically, an outermost pixel portion 61 located uppermost of the display region in FIG. 7 is the same as the outermost pixel portion 61 of FIG. 4, where the $C_s$ line 4 serves as the light-shielding pattern 9 and is wider than the other lines. A relatively large parasitic capacitance is therefore generated between the $C_s$ line 4 (light-shielding pattern 9) and the source lines 3. When the light-shielding pattern 9 is of the shape shown in FIG. 5A, in particular, the relatively large parasitic capacitance increases the time constant and results in signal delay in the case of a large-scale liquid crystal display device and/or a liquid crystal display device employing a driving method using an AC signal as the counter electrode signal, such as 1 H inversion driving and field inversion driving. Therefore, the time constant in signal delay of the Cs line 4 (light-shielding pattern 9) of the outermost pixel portion 61 nearest to the source line driving circuit 23 shown in FIG. 3 becomes larger than that of the pixel portions 60 other than the outermost pixel portions. As a result, a driving signal cannot be sufficiently applied to the portion of the liquid crystal layer corresponding to the outermost pixel portion 61. Thus, in the gray scale display, the portion of the liquid crystal layer is observed as bright lines in the normally white mode, while it is observed as black lines (gray) in the normally black mode. Reducing the time constant of the $C_s$ line 4 (light-shielding pattern 9) of the outermost pixel portion 62 is therefore required. In this example, the time constant is reduced in the following manner.

As shown in FIG. 7, the counter electrode signal (supplemental capacitance signal) is input, via connection lines 24, to one of $C_s$ main lines 4' which also serve as the light-shielding pattern 9 (i.e., vertical portions of the light-shielding pattern 9 formed along the right and left sides of the display region). The $C_s$ lines 4 (not shown in FIG. 7) which are connected to the pixels are connected to the $C_s$ main line 4', so that the counter electrode signal is input to a counter electrode of a supplemental capacitance electrode of each pixel via the corresponding $C_s$ line 4.

According to the present invention, the $C_s$ line 4 of the outermost pixel portion serves as the light-shielding pattern 9 as described above. The time constant of the $C_s$ line 4 (light-shielding pattern 9) of the outermost pixel portion is therefore larger than that of the $C_s$ lines 4 of the other pixel portions. In Example 2, the $C_s$ line 4 (light-shielding pattern 9) of the outermost pixel portion receives the counter electrode signal, not only via the $C_s$ main line 4', but also directly from the source line diving circuit 23. The counter electrode signal is input to the $C_s$ line 4 (light-shielding pattern 9) at a plurality of positions via connection lines 25.

Thus, the increase in the time constant of the $C_s$ line 4 (light-shielding pattern 9) of the outermost pixel portion due to its large width can be compensated by receiving the counter electrode signal at a plurality of positions of the $C_s$ line 4. This substantially reduces the time constant of the Cs line 4 (light-shielding pattern 9), preventing the display difference from the other pixel portions, which causes the trouble of being observed as bright lines or black lines, and thus improving the display quality.

When a source signal is applied to the pixels from one side of the display region as shown in FIG. 7, each TFT 1 is preferably formed on the side of the gate line 2 nearer to the source signal source (upper side in FIG. 7).

As for an outermost pixel portion 62 located farthest from the source driving circuit 23 (located lowermost of the display region in FIG. 7), the counter electrode signal is input to the corresponding portion of the light-shielding pattern 9 only via the $C_s$ main line 4' formed along a side of the display region. Although the time constant of this portion of the light-shielding pattern 9 may increase for the reason described above, the time constant of this level does not cause the trouble of being observed as bright lines and the like, since the portion of the light-shielding pattern 9 corresponding to the outermost pixel portion 62 located lowermost of the display region does not generate a supplemental capacitance.

However, the capacitance between the pixel electrode 6 and the light-shielding pattern 9 cannot be completely neglected. Therefore, the counter electrode signal is also input to the portion of the light-shielding pattern 9 corresponding to the outermost pixel portion 62, as input to the other $C_s$ lines 4, to ensure good symmetry with the pixel electrode 6 of the adjacent pixel portion 60. Since the line width of the light-shielding pattern 9 is larger than the width of the $C_s$ lines 4 and thus the resistance thereof is small, the formation of the light-shielding pattern 9 is effective in improving the reliability.

(EXAMPLE 3)

Figure 8:
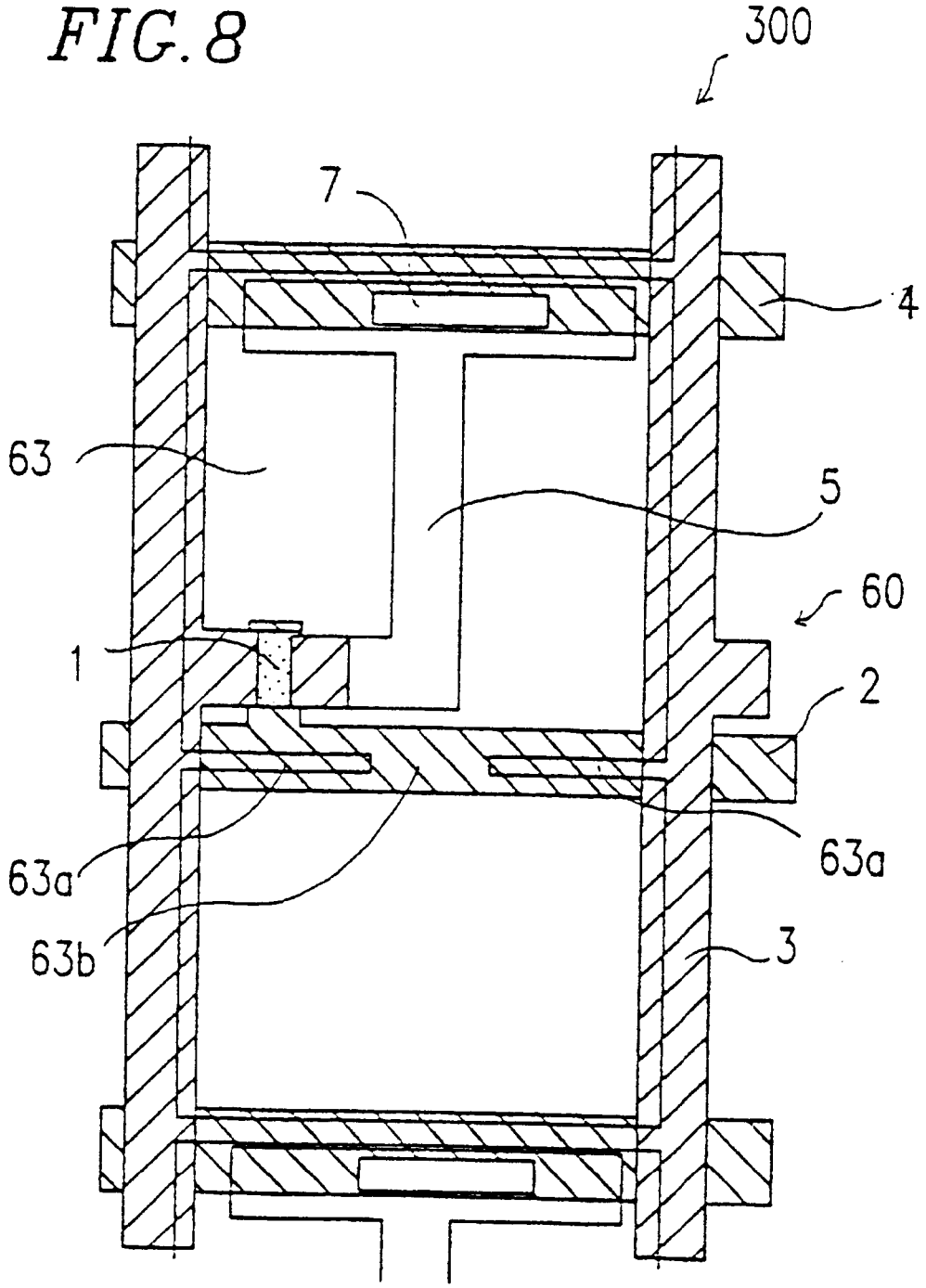
FIG. 8 is a plan view of one pixel portion of a liquid crystal display device of Example 3 according to the present invention.

FIG. 8 is a plan view of one pixel portion 60 of an active matrix substrate of a liquid crystal display device 300 of Example 3 according to the present invention. The same components as those in Examples 1 and 2 are denoted by the same reference numerals, and the detailed description thereof is omitted here.

In this example, the shape of pixel electrodes 63 is different from that of the pixel electrodes 6 in Examples 1 and 2. Each of the pixel electrodes 63 in this example is formed over the corresponding gate line 2 like the pixel electrode 6 in Examples 1 and 2. Unlike the pixel electrode 6, however, each of the pixel electrodes 63 has cutouts 63a formed at portions above the gate line 2. The cutouts 63a are formed at the opposite sides of the pixel electrode 63 as shown in FIG. 8, forming a connection portion 63b connecting two parts of the pixel electrode 63. With such cutouts 63a, the parasitic capacitance between the gate line 2 and the pixel electrode 63 can be reduced. As a result, the feedthrough due to the on/off operation of the switching element (TFT 1) is reduced, and thus the display quality of the liquid crystal display device 300 improves. Specifically, for example, when a liquid crystal display device with a screen size of 12.1 inches and XGA resolution was fabricated with the width of the gate line 2 of 18 $\mu$m, the width of the overlap of the pixel electrode with each line of 2 $\mu$m, and the width of the connection electrode 5 of 4 $\mu$m, the feedthrough was reduced to about ¼ when the cutouts 63a were formed, compared with when the cutouts 63a were not formed.

(EXAMPLE 4)

Figure 9:
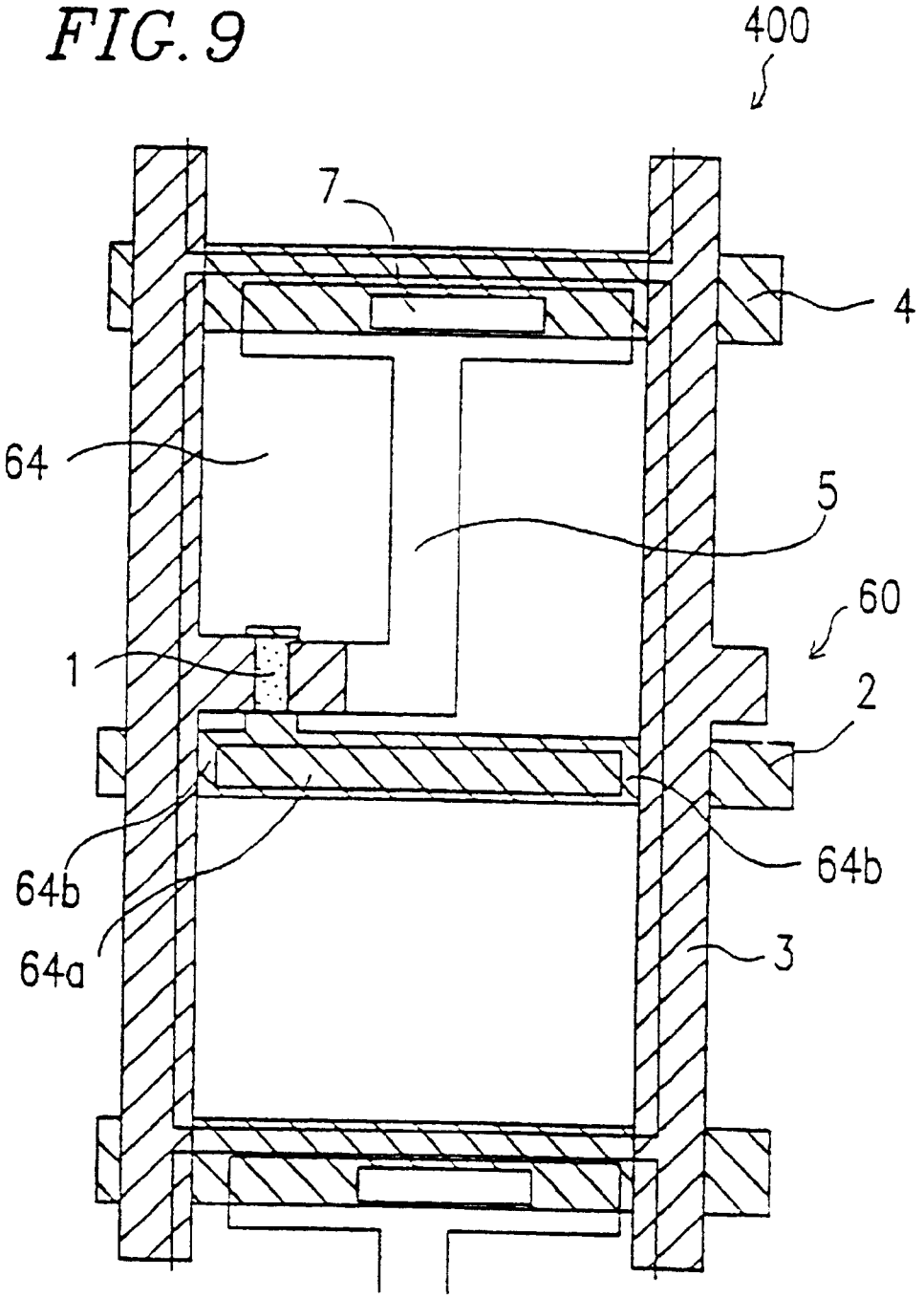
FIG. 9 is a plan view of one pixel portion of a liquid crystal display device of Example 4 according to the present invention.

FIG. 9 is a plan view of one pixel portion 60 of an active matrix substrate of a liquid crystal display device 400 of Example 4 according to the present invention. The same components as those in Examples 1 to 3 are denoted by the same reference numerals, and the detailed description thereof is omitted here.

In this example, the shape of pixel electrodes 64 is different from that of the pixel electrodes 6 in Examples 1 and 2. Each of the pixel electrodes 64 in this example is formed over the corresponding gate line 2 and has cutouts like the pixel electrode 63 in Example 3. While the pixel electrode 63 in Example 3 has one connection portion 63b in the center to connect two parts of the pixel electrode 63. the pixel electrode 64 in this example has a plurality of such connection portions.

For example, as shown in FIG. 9, a cutout 64a is formed in the center of the portion of the pixel electrode 64 located above the corresponding gate line 2, forming two connection portions 64b at the opposite ends. Since such connection portions 64b are narrow, they tend to be disconnected due to minor failure of patterning and existence of dust. Having two connection sections 64b, however, reduces the probability of total disconnection compared with the case of having only one connection portion. The probability of total disconnection further reduces when the distance between the two connection portions is long.

Forming the connection portions 64b at the opposite ends of the pixel electrode 64 reduces the parasitic capacitance between the gate line 2 and the pixel electrode 64, compared with the case where the connection portions 64b with the same widths are formed in the middle. Assume, for example, that the two parts of the pixel electrode 64 are connected by two connection portions 64b each having a width of 4 $\mu$m and that the overlap of the pixel portions 64 with each line is 2 $\mu$m. When such two connection portions 64b are formed in the middle, a parasitic capacitance is generated between the gate line 2 and the pixel electrode 64 over the area of the gate width×4 $\mu$m×2. On the contrary, when the connection portions 64b are formed at the opposite ends, the area where a parasitic capacitance is generated is the gate width×2 $\mu$m×2, which is a half of the case where they are formed in the middle. This is because 2 $\mu$m of the width of each of the connection portions 64b, 4 $\mu$m, overlaps the source line 3.

Thus, in this example, disconnection of the pixel electrodes 64 can be prevented by the above redundant structure of a plurality of the connection portions 64b, and the parasitic capacitance between the gate line 2 and the pixel electrode 64 can be reduced As a result, the feedthrough due to the on/off operation of the switching elements (TFTs 1) can be reduced, improving the display quality of the liquid crystal display device 400.

Figure 10:
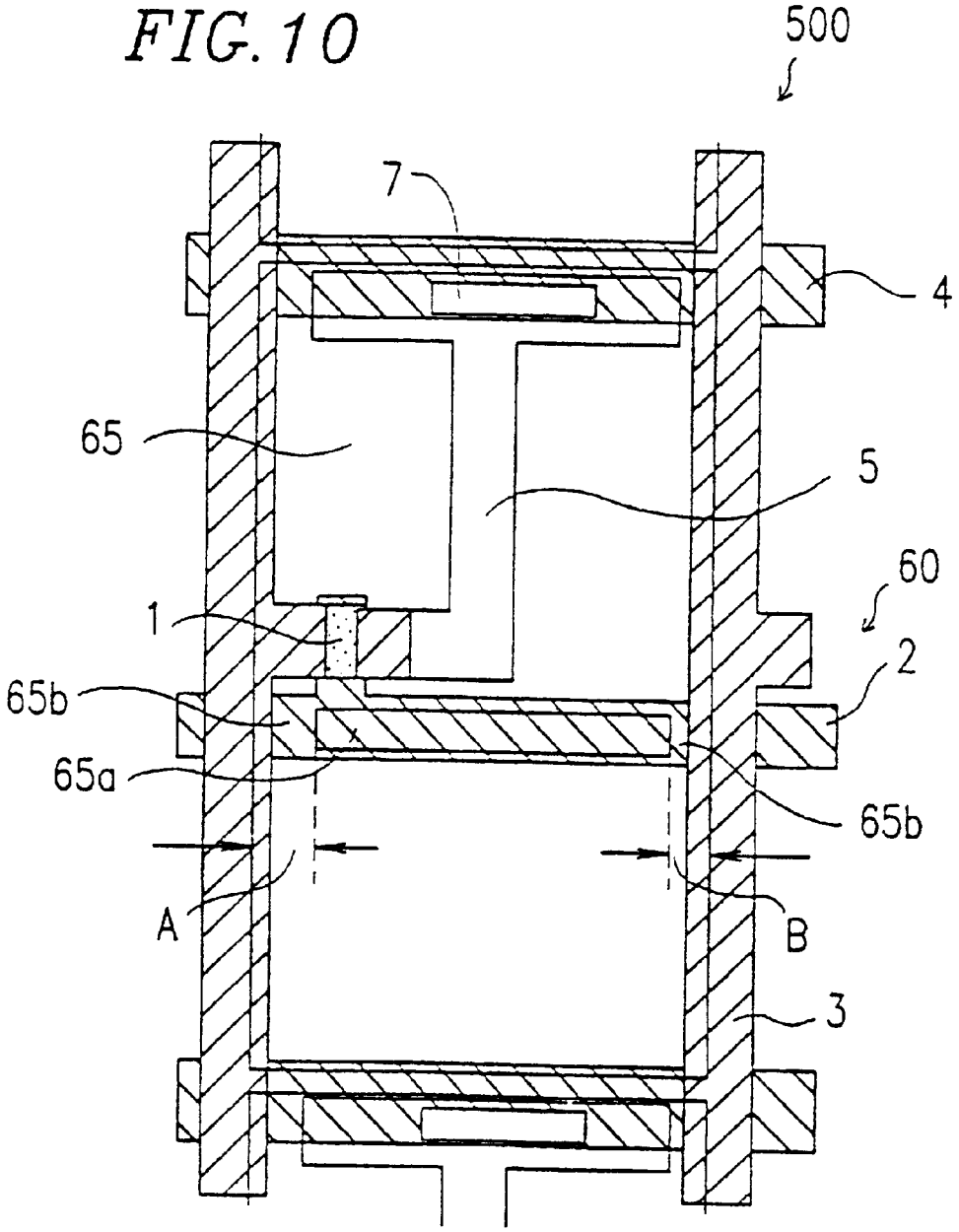
FIG. 10 is a plan view of one pixel portion of another liquid crystal display device of Example 4 according to the present invention.
Figure 11:
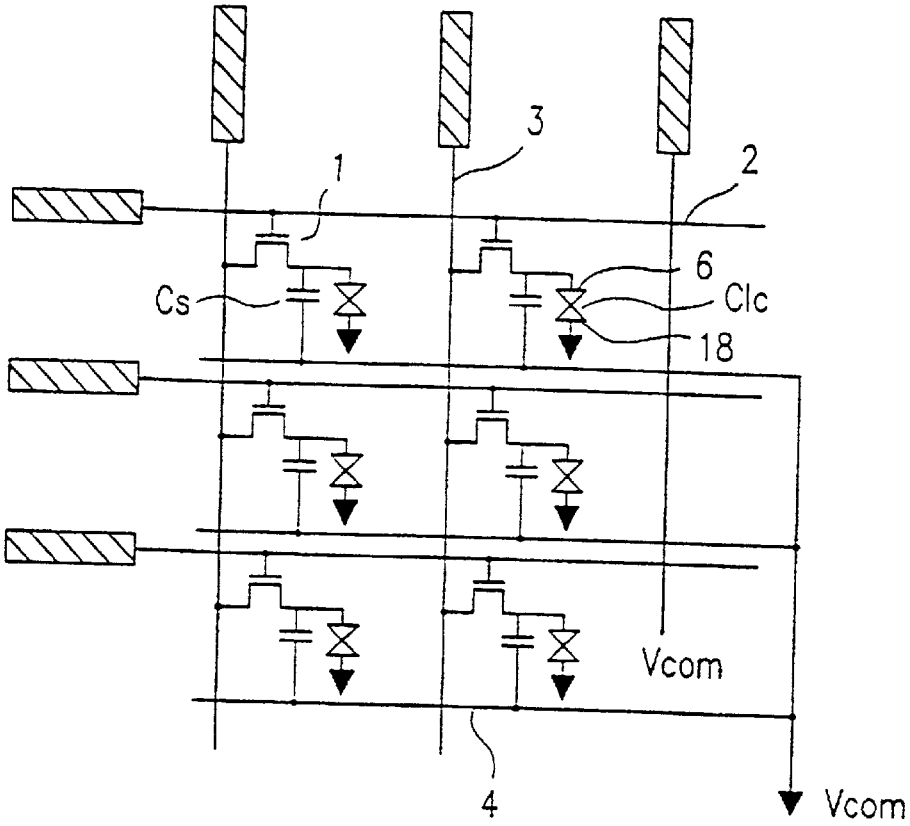
FIG. 11 is an equivalent circuit of a conventional active matrix liquid crystal display device.
Figure 12:
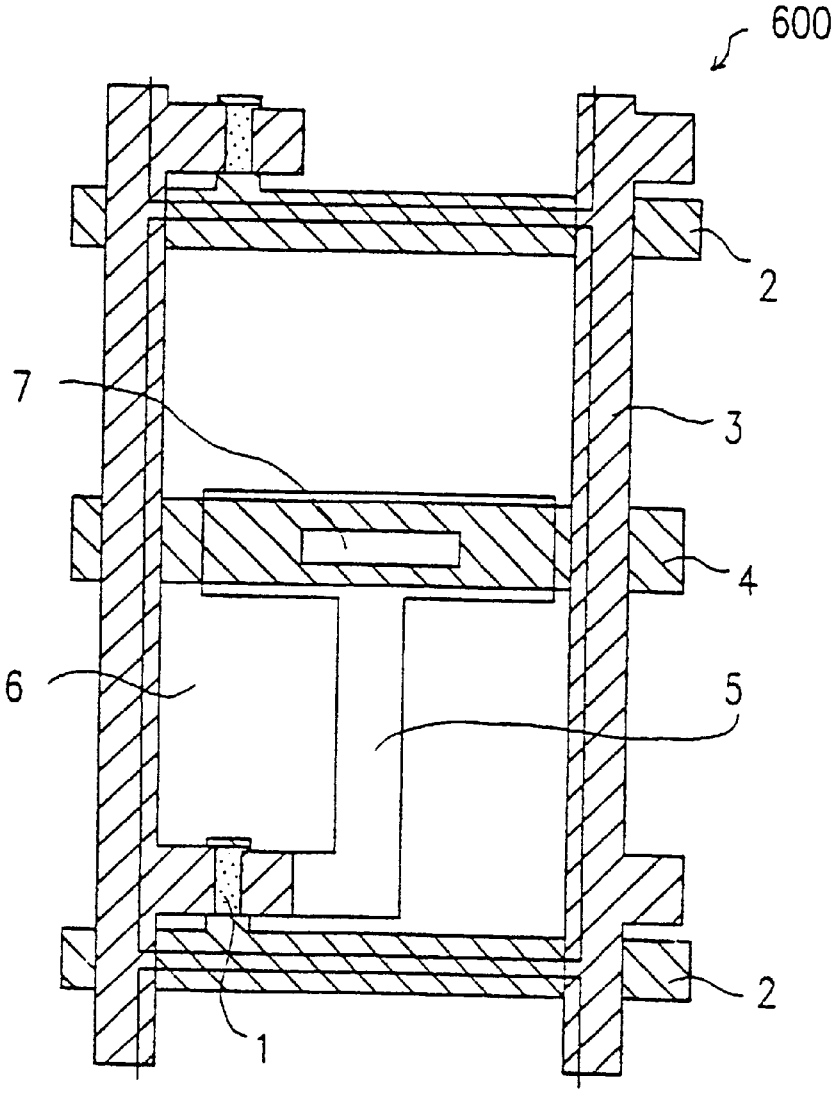
FIG. 12 is a plan view of one pixel portion of a conventional liquid crystal display device.
Figure 13:
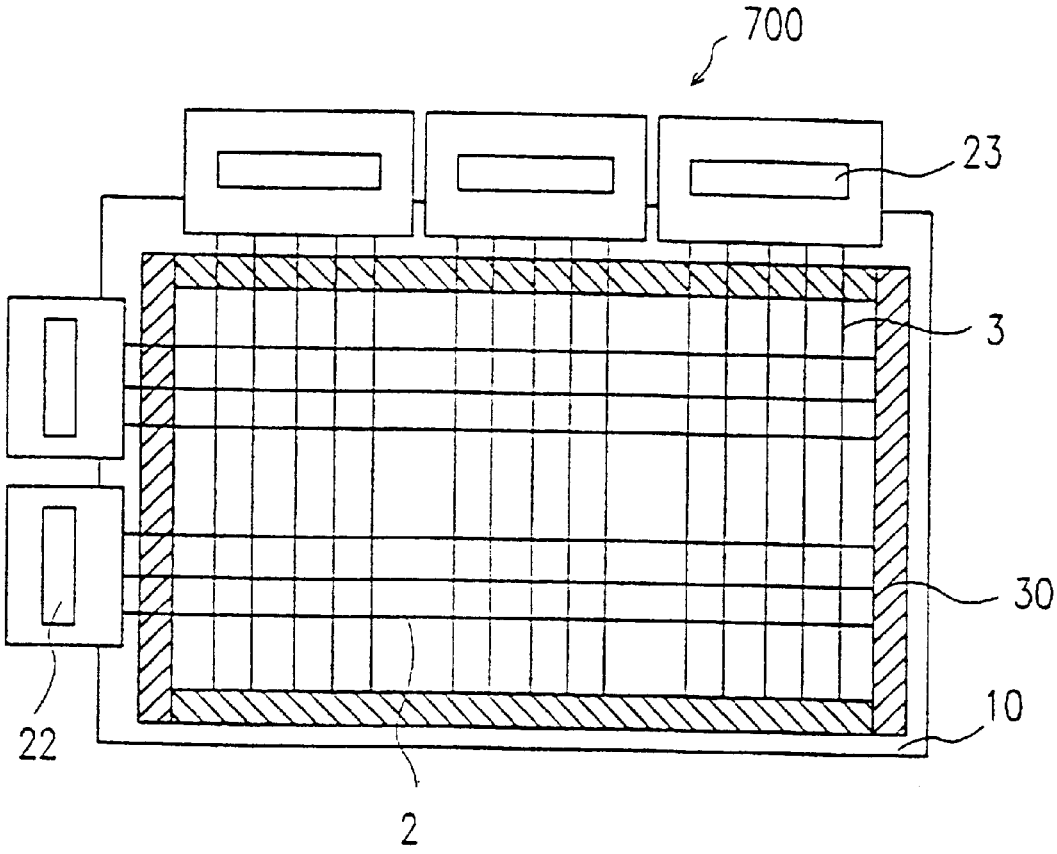
FIG. 13 is a view for describing a light-shielding pattern formed on an active matrix substrate.
Figure 14:
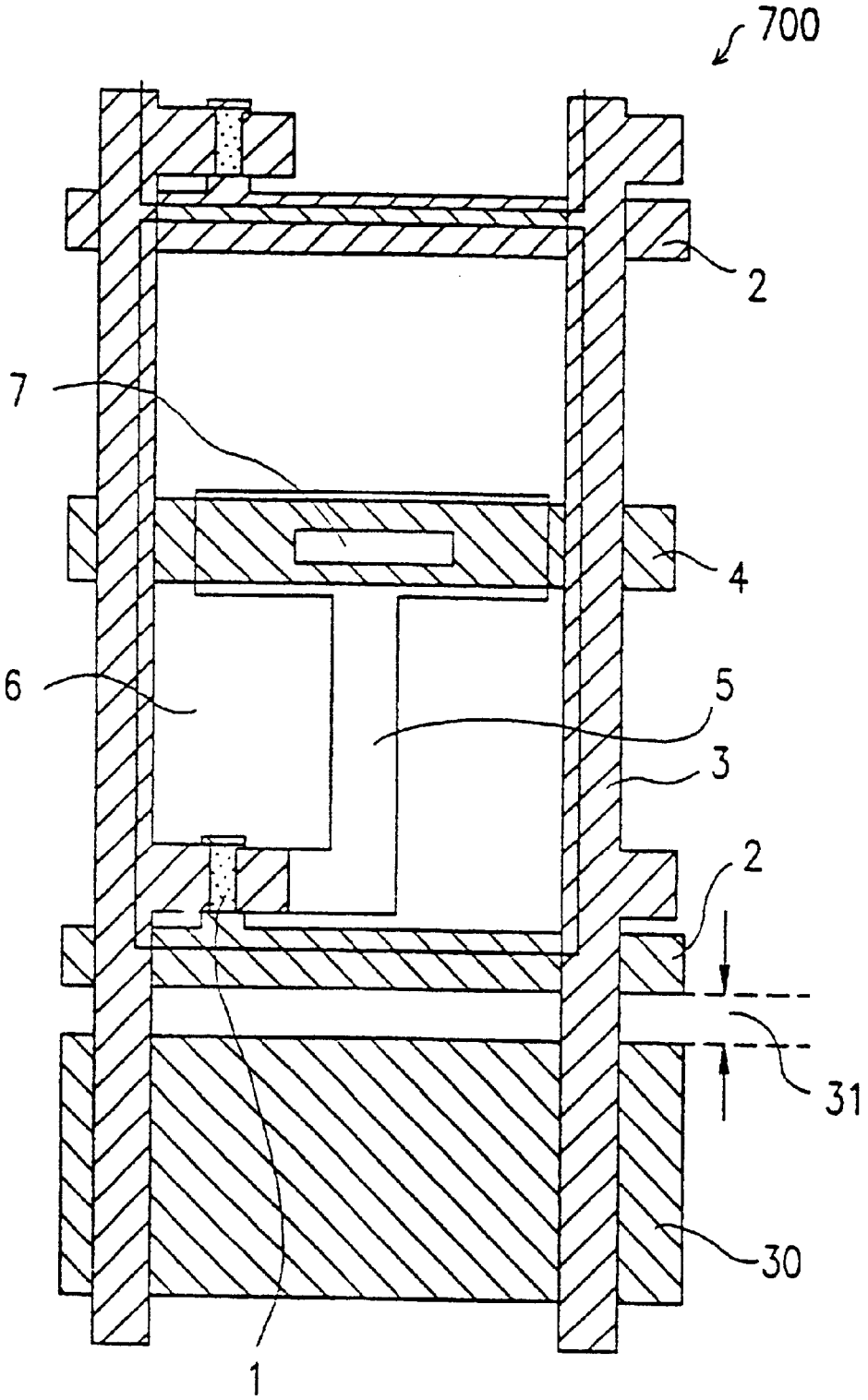
FIG. 14 is a view for describing a pixel portion located outermost of a display region and an adjacent light-shielding pattern of a liquid crystal display device.

FIG. 10 shows a liquid crystal display device 500 as a modified example according to the present invention, where a plurality of connection portions 65b with different widths are formed for connecting two parts of a pixel electrode 65.

In general, when an underlying layer of the pixel electrode 65 has a defect due to a damage or a foreign substance attached thereto, the portion of the pixel electrode 65 corresponding to such a defective portion tends to be easily disconnected. This is because a solution for wet etching or a gas for day etching seeps into such a defective portion at etching for forming the pixel electrodes 65, thus causing overetching. Such disconnection can be prevented by forming the connection portions 65b with different widths at the opposite ends, in particular, by forming a wider connection portion 65b (indicated by A in FIG. 10) at one end. With this configuration, even if the other narrower connection portion 65b (indicated by B in FIG. 10) is disconnected, the total disconnection (separation of the two parts of the pixel electrode 65) can be prevented since the connection via the wider connection portion 65b is available. In this case, compared with the case where both connection portions 65b are made wide, the parasitic capacitance and thus the feedthrough can be reduced more effectively. Thus, lowering of the display quality of the liquid crystal display device 500, as well as degradation of the liquid crystal due to application of a DC component thereto, can be prevented.

In the above examples, the portions of the light-shielding pattern 9 perpendicular to the source lines 3 (i.e., portions of the light-shielding pattern 9 along the upper and lower sides of the display region shown in FIG. 3 or 7) were described. The layouts of FIGS. 5A to 5C can also be used for the portions of the light-shielding pattern 9 perpendicular to the gate lines 2 (i.e., portions of the light-shielding pattern 9 along the right and left sides of the display region shown in FIG. 3 or 7), and the same effect can be obtained.

The arrangement of the $C_s$ lines 4 is not restricted to that described in the above examples, but the present invention is also applicable to the configuration where the $C_s$ lines are formed in parallel with the source lines 3 and the pixel electrodes 6 are separated from one another along the portions located above the gate lines 2 and the $C_s$ lines. In such a case, also, the same effect can be obtained.

Thus, in the liquid crystal display device according to the present invention, the peripheral region surrounding the display region can be shielded by use of the $C_s$ line. Accordingly, since no light-shielding film is required on the counter substrate, production cost is reduced. Lowering of the display quality of the liquid crystal display device can be suppressed by reducing the influence of the time constant of the line used for light shielding (light-shielding pattern).

A signal can be directly supplied from an external driving circuit to the $C_s$ line (light-shielding pattern) for light shielding of the peripheral region. This reduces the influence of the time constant of the $C_s$ line serving as the light-shielding pattern, and thus suppresses the lowering of the display quality.

The same signal as that input to the $C_s$ lines located in the middle of the display region is also input to the portion of the light-shielding pattern adjacent to the outermost pixel electrode located farthest from the external driving circuit. As a result, the symmetry between the outermost pixel electrodes and the other pixel electrodes improves, thereby improving the display quality.

The thickness of the interlayer insulating film formed between the scanning line (gate line) and the pixel electrode is made as large as 2 $\mu$m or more. With this configuration, the parasitic capacitance between the scanning line and the pixel electrode and thus the feedthrough can be reduced. Thus, lowering of the display quality and degradation of the liquid crystal due to application of a DC component thereto can be prevented.

A cutout is formed for the pixel electrode at a portion thereof located above the corresponding scanning line. With this configuration, the parasitic capacitance between the scanning line and the pixel electrode and thus the feedthrough can be reduced. Thus, lowering of the display quality and degradation of the liquid crystal due to application of a DC component thereto can be prevented.

A cutout is formed for the pixel electrode at a portion thereof located above the corresponding scanning line and a plurality of connection portions for connecting two parts of the pixel electrode defined by the cutout are formed. With this configuration, generation of pixel defect due to disconnection of the pixel electrode can be reduced.

The connection portions may be formed at the opposite ends of the pixel electrode. With this configuration, the parasitic capacitance between the pixel electrode and the scanning line and thus the feedthrough can be further reduced. Thus, lowering of the display quality and degradation of the liquid crystal due to application of a DC component thereto can be prevented.

The connection portions may have different widths, with one of the connection portions being wide, so as to prevent total disconnection due to overetching and the like. This reduces the parasitic capacity and thus the feedthrough, compared with the case where all the disconnection portions are made wide. Thus, lowering of the display quality and degradation of the liquid crystal due to application of a DC component thereto can be prevented.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising an active matrix substrate, a counter substrate having a counter electrode, and a liquid crystal layer interposed between the active matrix substrate and the counter substrate, the active matrix substrate including:

a plurality of scanning lines;

a plurality of signal lines formed perpendicular to the plurality of scanning lines;

switching elements formed in a vicinity of crossings of the plurality of scanning lines and the plurality of signal lines;

a plurality of pixel electrodes connected to corresponding ones of the signal lines via the switching elements; and a plurality of supplemental capacitance lines formed in parallel with corresponding ones of the scanning lines, wherein *at least some of* the pixel electrodes are formed [over] *to be in an overlapping relationship with* the corresponding scanning lines, and [divisions of the adjacent pixel electrodes along the signal lines are] *at least one edge of the at least some of the pixel electrodes is* located [above] *in an overlapping relationship parallel to* corresponding ones of the supplemental capacitance lines.

2. A liquid crystal display device according to claim 1, wherein one of the supplemental capacitance lines is located outermost of a display region of the active matrix substrate for the pixel electrode which is located at a first peripheral side of the display region, the supplemental capacitance line being wider than the other supplemental capacitance lines and serving as a light-shielding line.

3. A liquid crystal display device according to claim 2, wherein a counter electrode signal is directly applied to the supplemental capacitance line which is located outermost of the display region and serves as the light-shielding line at a plurality of positions.

4. A liquid crystal display device according to claim 2, further comprising a light-shielding line which is formed for the pixel electrode located at a second peripheral side of the display region opposing the first peripheral side, in parallel with the supplemental capacitance line located outermost of the display region.

5. A liquid crystal display device according to claim 4, wherein a counter electrode signal is input to the light-shielding line.

6. A liquid crystal display device according to claim 1, wherein each of the switching elements is formed on a side of the corresponding scanning line nearer to a signal source from which a signal is input to the signal lines.

7. A liquid crystal display device according to claim 1, wherein an [insulting] *insulating* film is formed between the scanning lines and the pixel electrodes, and the thickness of the insulating film is about 2 $\mu$m or more.

8. A liquid crystal display device according to claim 1, wherein each of the pixel electrodes has a cutout formed [above] *in an overlapping relationship parallel to* the corresponding scanning line.

9. A liquid crystal display device according to claim 8, wherein each of the pixel electrodes includes two parts defined by the cutout formed [above] *in an overlapping relationship parallel to* the corresponding scanning line and a plurality of connection portions connecting the two parts.

10. A liquid crystal display device according to claim 9, wherein the plurality of connection portions are formed at opposite ends of the pixel electrode.

11. A liquid crystal display device according to claim 9, wherein a width of at least one of the plurality of connection portions is different from a width of the other connection portions.

*12. A liquid crystal display device comprising an active matrix substrate, a counter substrate having a counter electrode, and a liquid crystal layer interposed between the active matrix substrate and the counter substrate, the active matrix substrate including:*

*a plurality of scanning lines;*

*a plurality of signal lines formed perpendicular to the plurality of scanning lines;*

*switching elements formed in a vicinity of crossings of the plurality of scanning lines and the plurality of signal lines;*

*a plurality of pixel electrodes connected to corresponding ones of the signal lines via the switching elements; and*

*a plurality of supplemental capacitance lines formed in parallel with corresponding ones of the scanning lines,*

*wherein the pixel electrodes are formed in an overlapping relation with the corresponding scanning lines, and a cutout is formed for at least one of the pixel electrodes at a portion thereof in an overlapping relationship parallel to the corresponding scanning line.*

*13. A liquid crystal display device according to claim 12, wherein a pixel aperture corresponding to each of the plurality of pixel electrodes is divided into two portions by the respective scanning line.*

*14. A liquid crystal display device according to claim 12, wherein each of the pixel electrodes includes two parts defined by the cutout formed in an overlapping relationship parallel to the corresponding scanning line and a plurality of connection portions connecting the two parts.*

*15. A liquid crystal display device according to claim 14, wherein the plurality of connection portions are formed at opposite ends of the pixel electrode.*

*16. A liquid crystal display device according to claim 14, wherein a width of at least one of the plurality of connection portions is different from a width of the other connection portions.*

* * * * *